3,824,187
TRI-n-AMYL LEAD SALT OF SATURATED
ALIPHATIC MONOCARBOXYLIC ACID
Richard D. Gorsich, Baton Rouge, La., assignor to
Ethyl Corporation, New York, N.Y.
No Drawing. Filed Jan. 24, 1962, Ser. No. 168,508
Int. Cl. C01f 7/00
U.S. Cl. 252—1                              7 Claims This invention relates to a new composition of matter and particularly to a novel type of organolead salt.

Many organolead salts are known and have been described in the literature. It has heretofore been observed that organolead salts particularly the trialkyllead salts of saturated aliphatic monocarboxylic acids readily crystallize from a wide variety of common organic solvents particularly at low temperature and decreased concentration. This phenomenon is easily demonstrated by observing the methods now most widely employed for synthesizing these organolead salts. The aforementioned processes usually call for a recrystallization step in order to obtain a pure product. The solvents used for this recrystallization are for instance hexane and other hydrocarbons, alcohols and ethers.

This tendency to crystallize decreases the effectiveness of organolead salts when employed as insecticides, fungicides and sternutatory agents due to the fact that it is usually desirable to use them in the form of a solution in an aerosol or a spray. This undesirable tendency to crystallize was pointed up by experiments reported in the Journal of the Chemical Society, 1949, pages 919 et seq. The sternutatory and vesicant properties of these salts being well known, it was proposed to use them as components of military gases. In order to obtain quantitative data as to their military effectiveness volunteers entered a hermetically sealed chamber into which was sprayed a solution of organolead salts in an organic solvent. The purpose of the experiment was to correlate the biological effect of this spray with the percentage of organolead salt in the atmosphere. However, the investigators were unable to obtain a reliable correlation due to the fact that the organolead salts crystallized and formed deposits on the walls of the chamber.

It is therefore an object of this invention to provide the art with a novel class of organolead salts which do not tend to crystallize from most organic solvents even at low temperatures and decreased concentration and especially when the solution is used in a spray, fog or the like.

This object is accomplished by heretofore unknown compounds, namely the tri-n-amyllead salts of saturated aliphatic monocarboxylic acids. Experimental work has definitely indicated that these compounds are infinitely soluble in a wide variety of organic solvents which are in commercial use.

This infinite solubility of the tri-n-amyllead salts of this invention is a very unexpected phenomenon. Even such closely related compounds as tri-n-butyllead acetate and triisoamyllead acetate have been found to readily crystallize from hexane and many other solvents. This vastly improved solubility of the n-amyl salts of this invention as compared to the corresponding isoamyl salts is unique also in that the usual expedients which have been employed in the art to improve solubility of a material in hydrocarbon solvents is to use compounds containing branched chain hydrocarbon groups rather than straight chain hydrocarbon groups.

The chemical compounds encompassed by this invention are preferably the tri-n-amyllead salts of saturated aliphatic monocarboxylic acids wherein said acid contains 1–20 carbon atoms. The tri-n-amyllead salts of acids containing 1–8 carbon atoms are particularly recommended for most biocidal uses because of their superior effectiveness against common organisms. Examples of the salts of this invention are tri-n-amyllead formate, tri-n-amyllead acetate, tri-n-amyllead propionate, tri-n-amyllead isopropionate, tri-n-amyllead valerate, tri-n-amyllead heptoate, tri-n-amyllead palmitate, tri-n-amyllead dodecanoate, tri-n-amyllead pentadecanoate, tri-n-amyllead heptadecanoate, tri-n-amyllead octadecanoate, tri-n-amyllead eicosanoate and the like. As was indicated above the salts of acids containing 1–8 carbon atoms are recommended and for economy and optimum effectiveness for pesticidal and vesicant uses tri-n-amyllead acetate is particularly preferred.

The organic solvents in which these desired and unique solubility characteristics are manifested include hydrocarbons, halogenated hydrocarbons, amines, alcohols, ketones, ethers, esters, animal and vegetable oils, silicon oils and greases, resins, and paints.

The particular solvent chosen of course depends upon the use for which the solution is intended. Normally, the commercially available, inexpensive solvents such as kerosene and petroleum ether are preferred solvents. For use as an aerosol or spray a solvent of low viscosity is generally preferred. If however, it is desired to coat piling with an antiship worm composition a viscous material such as tar or a resin would be desired. In the event that an object is to be coated permanently with a biocidal composition a shellac or an ester which solidifies upon exposure to the atmosphere is advantageous.

The concentration of the tri-n-amyllead salt used in forming these useful solutions or formulations follows well-established practice. For most biocidal uses the present compounds are used in low concentrations ranging from a fraction of one percent by weight up to several percent or more. However for practical purposes the concentration is limted only by the particular use for which the solution or formulation is intended consistent with toxicity and related considerations. As noted above, the miscibility of the present compounds in common solvents and carriers insures their continued presence at the locus of the biocidal treatment even when applied as a concentrated spray or fog; premature evaporation of the solvent is no longer a problem. Moreover, this great solubility greatly simplifies blending and formulation operations since highly concentrated stock solutions can be readily formed and diluted to the desired use concentrations.

The tri-n-amyllead salts may be prepared by methods which have been used in synthesizing other alkyllead salts. One such method comprises mixing tetra-n-amyllead with the appropriate saturated aliphatic monocarboxylic acid in the presence of a catalyst such as silica gel in a water solution and heating the mixture at approximately 90° C. for about 1 hour. Another useful method consists of converting a tetra-n-amyllead into the tri-n-amyllead chloride and thence to the tri-n-amyllead hydroxide which on treatment with an appropriate aliphatic acid in aqueous solution yields the trialkyllead salt. A variation of the above process is to react the tetraalkyllead hydroxide with a sodium salt of an aliphatic acid.

An execellent process which is particularly well adapted to the preparation of the tri-n-amyllead salts of this invention is to react a tri-n-amyllead halide with a metal salt of an aliphatic monocarboxylic acid in an ether solution. The reaction is conducted at a temperature in the range of from about −20° to about 200° C. for a period of time rarely exceeding 5 minutes sufficient to effect the desired reaction. The product is then recovered in a very pure form by stripping off the ether solvent. Among the advantages of this process is the fact that it normally yields the tri-n-amyllead salts in a much higher state of purity than the other processes referred to above. In fact, recrystallization is not necessary in this process. It is pointed out that it is apparently impossible to purify the tri-n-amyllead salts of this invention by recrystallization because of their miscibility in most organic solvents. Therefore the use of a process which ordinarily requires recrystallization is definitely not recommended.

In order that those skilled in the art may better understand this invention the following example is given.

EXAMPLE

Twenty grams of tri-n-amyllead bromide was dissolved in 40 milliliters of tetrahydrofuran. To this solution was added with stirring 8.4 grams of silver acetate. The reaction proceeded to completion at room temperature almost instantaneously. The solution was filtered and the solvent stripped off to give 11.4 grams of tri-n-amyllead acetate, a colorless, odorless, crystalline solid. Therefore this product was formed in 58 percent yield.

The general procedure of this example can be followed using other metallic salts of the aliphatic monocarboxylic acids such as the metal propionates, butyrates, valerates, caproates, dodecates, pentadecates, heptadecates, eicosanates, and the like. In this way, the tri-n-amyllead salts of these acids are formed rapidly and in good yield.

Tri-n-amyllead acetate when dissolved in various organic solvents such as hexane, ethyl alcohol and the like could not be crystallized out of solution. All attempts at effecting crystallization proved unsuccessful and the lead salt remained in solution even when surrounded by Dry Ice.

In comparison to this result triisoamyllead acetate and tri-n-butylead acetate were prepared in the same manner as described in the above example. It was found that these two compounds crystallized readily from solution when placed in the Dry Ice bath, a result which would be expected from an examination of the literature.

The compounds of this invention are very well adapted for use as slimicides in wet hydrocarbon fuels (gasolines, jet fuels, etc.), as fungicides, as insecticides, as miticides, and as germicides. The trialkyllead salts of this invention may also be used in stabilizing polyvinyl chloride and related chlorinated polymers. The tri-n-amyllead acetate has been noted to possess very effective vesicant and sternutatory properties which adapt it for use in military gases, fogs, sprays and the like. Exposure of the skin to even minute amounts of this compound will often produce severe blistering and related manifestations. The excellent solubility properties of the salts of this invention are of considerable value in the foregoing utilities.

Examples of the hydrocarbon solvents which can be used in preparing useful formulations are petroleum ether, petroleum naphtha, gasoline, kerosene, jet fuel, diesel fuel, butane, pentane, n-hexane, isohexane, n-heptane, isoheptane, isooctane, pentene, benzene, toluene, xylene, cyclohexane, terpentine, terpene solvents, α-pinene, β-pinene, pine oils and the like.

Examples of halogenated hydrocarbon solvents are methyl bromide, methyl chloride, dichloromethane, chloroform, carbon tetrachloride, ethyl chloride, ethylene dibromide, ethylene chlorobromide, ethylene dichloride, dichloroethylene, trichloroethylene, tetrabromoethane, tetrachloroethane, pentachloroethane, hexachloroethane, isopropylchloride, allyl chloride, propylene dichloride, n-amyl chloride, dichloropentane, n-hexylchloride, monochlorohydrin, dichlorohydrin, glycerol α-monochlorohydrin, dibromobenzene, monochlorobenzene, trichlorobenzene, o-chlorotoluene, p-chlorotoluene, α-chloronaphthalene, diamylchloronaphthalene, dichloroethyl ether, dichloro diisopropyl ether, triglycol dichloride, dichloro difluoromethane and the like.

Examples of the amine solvents which may be used are monomethylamine, dimethylamine, trimethylamine, monoethylamine, diethylamine, triethylamine, propylamine, butylamine, dibutylamine, tributylamine, amylamine, hexylamine, ethyl butyl amine, heptyl amine, ethylhexylamine, ethylene diamine, propylene diamine, diethylene triamine, ethylbenzylamine, cyclohexylamine, dicyclohexylamine, pyridine, butadiene, picoline, quinoline, monoethanol amine, triethanolamine, diethanolamine, morpholine, phenyl morpholine, and the like.

Examples of the alcohols which may be used as solvents are methanol, ethanol, propionol, butanol, fusel oil, amylalcohol, heptanol, phenol, benzyl alcohol, methylcyclohexanol, trimethylcyclohexanol, dimethyl tolyl carbinol, furfuryl alcohol, tetrahydrocarbon furfuryl alcohol, ethylene glycol, propylene glycol, diethylene glycol, triethylene glycol, polyethylene glycol, glycerol, terpene alcohol and the like.

Examples of the ketones which may be used as solvents are acetone, methyl acetone, methylethyl ketone, methyl-n-propyl ketone, methylisobutyl ketone, methyl-n-amyl ketone, ethylbutyl ketone, di-n-propyl ketone, methylhexyl ketone, diisobutyl ketone, diacetone alcohol, acetonyl acetate, mesityl oxide, cyclohexanone, methylcyclohexanone and the like.

Examples of the ethers which may be used as solvents are ethyl ether, isopropyl ether, butyl ether, amyl ether, hexyl ether, ethylene glycol monomethyl ether, ethylene glycol monophenyl ether, ethylene glycol monobenzyl ether, diethylene glycol monobutyl ether, diethyl acetal, 1,2-propylene oxide, 1,4-dioxane, methylal, 2-methyl furan, tetrahydrofurane, tetrahydrofuran and derivatives thereof, 2,3-dihydropyran, pentamethylene oxide, trioxane, terpinyl methyl ether, terpinyl ethylene glycol ether and the like.

What I desire to claim and secure by Letters Patent of the United States is as follows:

1. A tri-n-amyllead salt of a saturated aliphatic monocarboxylic acid containing 1–20 carbon atoms.
2. The composition of Claim 1 wherein the saturated aliphatic monocarboxylic acid radical contains 1–8 carbon atoms.
3. Tri-n-amyllead acetate.
4. As a composition of matter, a tri-n-amyllead salt of a saturated aliphatic monocarboxylic acid as defined in Claim 1 dissolved in an organic solvent.
5. Tri-n-amyllead acetate dissolved in a hydrocarbon solvent.
6. As a composition of matter, a tri-n-amyllead salt of a saturated aliphatic monocarboxylic acid containing 1 to 20 carbon atoms dissolved in a hydrocarbon solvent containing from about 4 to about 8 carbon atoms and containing only carbon and hydrogen atoms in the molecule.
7. As a composition of matter, tri-n-amyllead acetate dissolved in hexane.

References Cited

Saunders et al.: *Journal of the Chemical Society* (London), 1949, pp. 919–925.

McCombie et al.: *Nature;* Vol. 159, 1947, pp. 491–494.

LELAND A. SEBASTIAN, Primary Examiner

U.S. Cl. X.R.

44—69; 260—45.75R, 414, 435, 436; 424—293